Jan. 6, 1959   H. SCHNEIDER ET AL   2,867,357
FILLABLE CONTAINER

Filed Oct. 25, 1956   2 Sheets-Sheet 1

United States Patent Office 2,867,357
Patented Jan. 6, 1959

2,867,357

FILLABLE CONTAINER

Hermann Schneider and Hedwig Schneider, nee Hommel, Hamburg-Altona, Germany

Application October 25, 1956, Serial No. 618,389

Claims priority, application Germany October 26, 1955

7 Claims. (Cl. 222—212)

The invention relates to a fillable container for liquids such as perfume or similar liquid cosmetics.

The invention relates to containers and especially to small containers for liquids such as perfume or similar liquid cosmetics, preferably made of thermoplastic injection mouldable material.

An object of our invention is the provision of a novel container with two valves for controlling inlet and outlet openings separated from each other.

A further object is to provide a container which is easy to be filled without wasting liquid and which is adapted to deliver its contents in small amounts.

Another object is the provision of a sealable and unbreakable container which is easy to be refilled without wasting liquid.

A further object is to provide a container which could be refilled from a stock-bottle without any auxiliary means such as funnels.

Another object is to provide a container with a sealable inlet port and a separated outlet or delivering opening.

A further object is the provision of a container in which the inlet port has a substantially greater diameter than the outlet port.

Another object is the provision of a small container having replaceable coatings, covers or cases with embossing, pictures or information for use as an advertising matter.

A further object is the provision of a refillable container which is on the one hand ready for use and for delivering liquid by removing only a cap of the container and which is on the other hand leakproof.

A further object is the provision of a filling and delivering device especially for containers, which has two valve controlled openings, both openings being adapted to be sealed effectively and separated from each other.

Another object is the provision of a filling and delivering device for containers being inexpensive in manufacture and effective in use for filling containers within a short time and without wasting liquid and for delivering liquid in small amounts.

The invention achieves these objects by the provision of an elastic cylindrical container preferably consisting of synthetic resin with reinforcements at both ends and a sealable delivery and filler device at one end. The material constituting the container is preferably a mouldable synthetic resin, which may be a polyamide type synthetic resin or other moldable pliable material. These materials permit a portion of the two-part delivery and filler device in the cylindrical container to be moulded,. The other part of the delivery and filler device includes a ball valve, the ball of which projects partially from the orifice of the device and permits the delivery of the perfume or other contents by dabbing or stroking and the like, so that a free distribution of the contents of the container is reliably obtained on the most sparing treatment of the surface due to rolling or rotation of the ball. Sealable filling openings are provided in the delivery and filler device, which can be exposed or sealed by relative movement of the two parts.

The delivery and filler device is protected by a cap member which can be disposed on the end and is securable to a threaded nozzle, and is provided with sealing surfaces which engage preferably over elastic intermediate sealing insertions with the ball valve opening and, if desired, with other rim or abutment surfaces on the threaded nozzle. The intermediate sealing insertions preferably consist of a resilient sealing disc made of a polyurethane type material. The end of the threaded nozzle into which the delivery and filler device is moulded has a peripheral rim portion at its edge. Similar projections or sealing surfaces are provided in a particular embodiment of the cap to give additional sealing, which either engage with the rim or with the surface located inside the rim. The sealing pressure is produced by screwing on the cap, wherein damage to the ball valve is prevented by the elastic sealing insertion. The cap also consists of synthetic resin, in a preferred embodiment of the invention, and is provided with a casing preferably of surface-treated light metal, brass, chromium-plated steel, silver or other precious metal.

Further attachments are provided on the reinforced ends of the cylindrical container, i. e. on the bottom and on the projection of the threaded nozzle, also preferably of surface-treated light metal, brass, chromium-plated steel, silver or other precious metal, which increase the rigidity of the container at these parts, and because their diameter exceeds that of the cylindrical container, also protect the container against accidental pressing. In particular, the base part is so constructed that the container can be stood upright on it.

The metal reinforcing parts also serve for securing a cover or case for the container, for example of leather, fabric, synthetic leather or synthetic resin sheet, which is provided with embossing, pictures or information, wherein the pictures or information can particularly be used also as advertising matter.

An embodiment of the invention is illustrated in the accompanying drawings. Further advantages and features will appear from the description of this embodiment. In the drawings.

Figure 1:
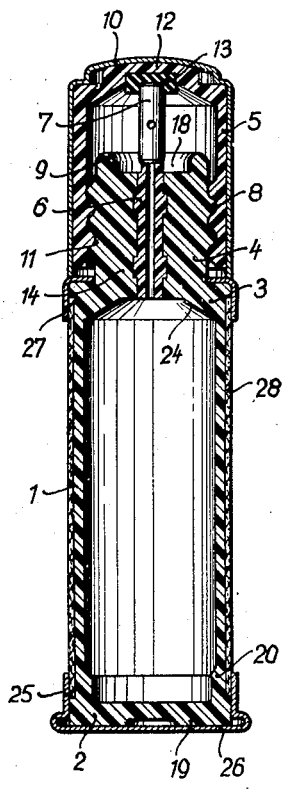
Fig. 1 shows a section through the container with the cap in place.

The cylindrical container 1 is provided with a base part 2 and an upper end part 3 upon which a threaded nozzle 4 for securing a cap member 5 is arranged. The container shown in Fig. 1 is moulded, the end parts and the threaded nozzle 4 being produced in a single operation. It will be clear that the walls of the container are made thin between the end parts 2 and 3, so that the elasticity inherent in the material used can be fully employed in order either to force out the container contents through the delivery device or to form a vacuum to draw in liquid on filling the container by initial compression and subsequent release. The end parts 2 and 3 are so constructed that they cannot be compressed. The container thus has a certain rigidity which protects it against unintentional pressure effects. Compression of the container can only be effected when the pressure is exerted on the region between the end parts 2 and 3.

In manufacturing the container, a part 6 of the delivery and filler device is moulded within the threaded nozzle 4. The part 6 is subsequently connected with another part 7 in which a ball valve is located.

The threaded nozzle 4 is provided with a screw thread 8 on its outer surface. A peripheral rim 9 is provided at its upper end, which concentrically surrounds the delivery and filler device projecting from this end surface. A cap 5 engages with the threaded nozzle 4, namely the screw thread 8, which is constructed cylindrically and is provided with an internal screw thread 11. The length of the cap is dimensioned so that the inside of its end plate or disc 12 abuts the orifice of the valve part 7 when screwed on to the thread 8. A well is provided in the central region of the inside of the end disc 12 for receiving a resilient sealing disc 13, which covers the valve orifice and hence resiliently contacts the valve member.

The cap 5 is preferably likewise made of synthetic resin and provided externally with a covering 10 of metal. This covering preferably projects downwardly beyond the lower end of the cap 5.

Figure 2A:
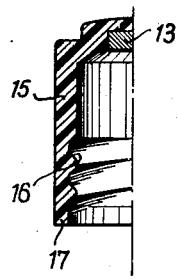
Figs. 2a, 2b, 3a and 3b show variants and details of the embodiment shown in Fig. 1.

In the cap construction shown in Fig. 1, the thread 8 is so arranged that it stands away from the shank of the threaded nozzle member. The beginnings of the thread 11 on the cap 5 engaging with this screw thread 8 likewise are spaced from the cylindrical inner wall of the cap 5, so that there are free spaces above and below the thread between the external wall of the rim 9 or the shank 14 and the internal wall of the cap 5. Another embodiment of a cap 15, which is shown in Fig 2a, is constructed with a screw thread 16 sunk into the wall of the cap. In this embodiment, the wall thickness at the lower rim 17 of the cap is reduced. In this embodiment, the internal wall of the cap above the thread 16 abuts the external wall of the rim and so provides an additional seal. There is another embodiment of the invention in which the thread 8 is formed in the shank 14 of the nozzle. In this construction, with the thread arrangement in the cap 5 as shown in Fig. 1, an insert is provided between the external wall of the rim 9 and the internal wall of the cap.

In general, the cap 15 is formed in the same way as the cap 5. Variations are possible within the scope of the invention, in which for example an inwardly directed abutment flange or step-like reduction of the drilling in the region in front of the end disc 13 is so arranged that the abutment flange or the steps formed by the reduction abut the upper surface of the rim 9. In particular, depressions can be provided in the abutment surfaces arranged in the cap in which the rim 9 engages. Additional resilient sealing rings can be inserted in these depressions, so that a complete sealing is thus given.

In another construction, the cap is so constructed at its upper end that it includes a drilling of a diameter which is only slightly greater than that of the valve part 7. The rim of this drilling rests on the end surface 18 of the threaded nozzle 4 within the rim 9. In this construction, the latter engages in an annular depression of sufficient depth provided for this purpose inside the cap. In this construction, additional sealing means can be inserted at the places where the cap and container parts are in contact.

Figure 2B:
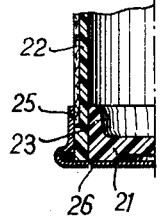

In the embodiment shown in Fig. 1, the base part 2 comprises a portion integral with the remainder of the container. The rim 20 of the container is strengthened above the end surface 19 so that the rigidity of the end surface is increased. This effect is augmented by constructing the end surface 19 with a greater thickness than the walls of the container 1. A further construction within the scope of the invention consists of a base 21 according to Fig. 2b inserted subsequently in the tubular, open container 22 and secured for example by cementing or welding. A corresponding location of the base 21 is shown in Fig. 3b in which the base part 21 has a strengthening projection 23 projecting into the inside of the container and reducing towards the container, which is increaseingly elastically deformable, particularly in elongated constructions, also within the scope of the invention, at increasing distances from the end wall 21. This construction ensures that, particularly with an inserted base 21, no excessive straining of the connection can occur. A corresponding gradual change is provided in the region of the end 3 by the coned portion 24 of the internal end of the container space.

The lower end of the container is provided in the region of the base 2 with a cap 25 of metal, preferably surface-treated light metal, brass, chromium-plated steel, silver or other precious metal. This cap has an enlarged base surface 26 in relation to the diameter of the container, which facilities standing of the container in an upright direction and also, by the rim 20 given, forms an additional protection for the container and a gripping edge, which prevents the relatively small container slipping from the hand. A corresponding metal attachement 27 is located over the upper end 3. This attachement is also made annular and rests with one of its flanks on the outside of the end part 3, i. e. the stepped surface formed below the shank 14 of the nozzle 4. The other flank of the attachement 27 is bent at right angles and has a cylindrical shape. This flank rests on the upper end of the cylindrical container 1. The cap 25 has a corresponding cylindrical part. In one particular constructional form of the invention, the cylindrical rim part of the metal cap 25 and the attachment 27 extend so far on the outside that on the inside of the container the reinforcements are drawn through the container or base material into the inside of the container.

Apart from strengthening, the parts 25 and 27 have the additional purpose of holding or clamping a covering on to the cylindrical container. This covering, which is shown in Fig. 1 at 28, is extremely flexible and clings to the container wall. In the construction according to Fig. 1, the external wall of the cylinder in the region covered by the covering 28 is stepped inwardly by an amount which corresponds to the thickness of the covering. The cylindrical flanks of the base cap 25 and the attachment 27 engages over the upper and lower ends of the covering and clamp or hold it on the cylindrical container, so that at the ends of the covering there is no exposed edge whereby the covering could be removed.

Figure 3A:
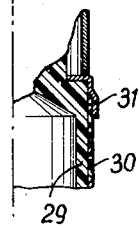
Figure 3B:
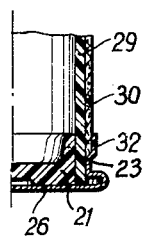

Another embodiment is shown in Figs. 3a and 3b. In this embodiment, the outer surface of the container wall 29 is made smooth and the covering 30 is applied to this wall. In this construction, the cylindrical parts 31, 32 of the attachments at the end 3 and the base cap are stepped outwardly by the thickness of the covering 30, so that they engage over the covering 30 and so hold its ends on the container wall 29.

Both in the embodiment according to Fig. 1 and in the embodiment according to Fig. 2, the covering 28 or 30 is preferably replaceable, the attachment part 27 and the base cap 25 being removably secured so that after removing the parts the covering 28 or 30 can be taken off and replaced by a new covering. This interchangeability or the possibility of subsequent provision of the covering given by this interchangeability makes the container according to the invention particularly suitable for use as an advertising article, since by the preferred construction corresponding information or markings can be provided permanently and in a pleasing manner.

The attachment part 27 serves otherwise as an abutment for the lower rim of the metal covering 10 of the cap 5. The closed container thus has an attractive appearance. There is also the possibility of providing an additional sealing ring on the lower rim of the cap within the metal covering 10 and above the rim of the cap 5.

Figure 4:
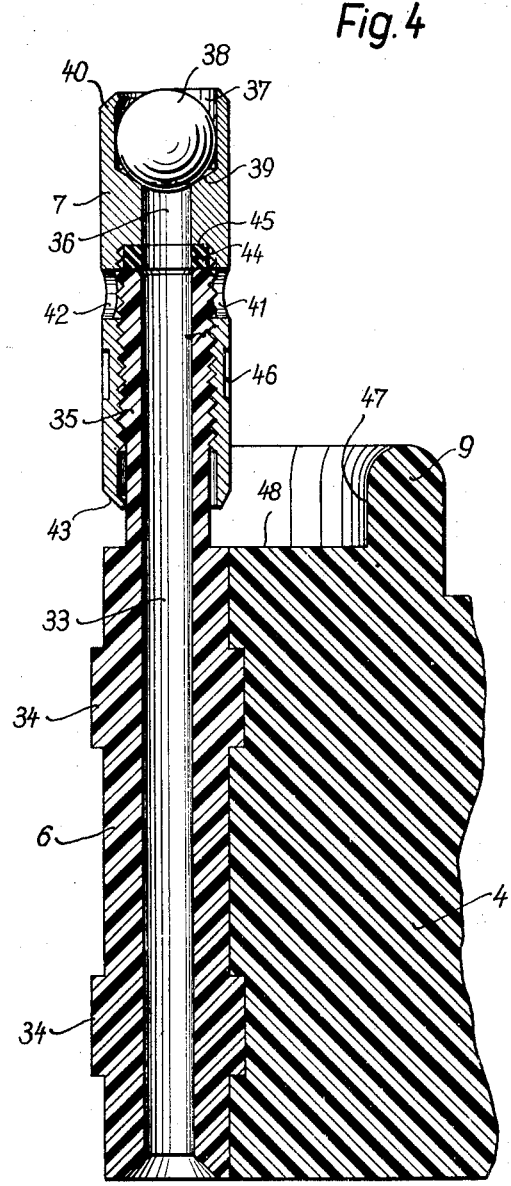
Fig. 4 shows a section through the delivery and filler device.

The delivery and filler device is shown on an enlarged scale in Fig. 4. Whereas Figs. 1–3 show the container on a 2:1 scale, the illustration of Fig. 4 has a ratio of 10:1 to natural size.

In Fig. 4, the threaded nozzle 4 is indicated only on one side of the delivery and filler device. The shank part 6 is moulded into the threaded nozzle 4, which has the peripheral rim 9 at its upper edge, during manufacture of the container. This shank part 6 represents the connection to the inside of the container and has a passageway 33 in its inside. The shank part 6 embedded in the container material is provided with annular flanges or rings 34, which ensure its satisfactory location. On the end 35 projecting upwardly from the container, the shank part is provided with an external screw thread. This thread serves to receive the valve part 7 which is likewise provided with a passageway 36. The lower end of the valve part 7 is drilled out to a larger cross-section than the passageway 36. This corresponds essentially to the diameter of the end 35 of the shank part 6. A screw thread is provided on the inside of the drilling in the valve part 7, which engages with the corresponding thread on the projecting end 35 of shank part.

The valve part 7 has a well 37 of greater diameter than the passageway 36 at its upper end. This well serves to receive a valve body 38 which is formed as a ball. The lower end of the well 37, which is formed by a shoulder 39 sloping towards the passageway 36, serves as a valve seat for the ball 38. After inserting the ball 38, the upper rim 40 of the valve part 7 is upset inwardly and so forms an abutment preventing escape of the ball 38, and also forms a seat for the ball acting as a throttle valve in the delivery of perfume. The upper rim 40 of the valve part 7 is upset inwardly to an extent such that the ball 38 slightly projects in the middle above the plane defined by the edge of the rim 40. The distance between the shoulder 39 and the rim 40 is so dimensioned that the ball 38 can move axially of the valve part 7.

The valve part 7 has a number (preferably two) of radial drillings 41, 42 in its middle region. These drillings are so formed that they are covered by the wall of the end 35 of the shank part 6 when the valve part 7 is screwed up so as to abut this end. After assembly of the parts 6 and 7, the lower rim 43 of the valve part is upset inwardly so that it tightly surrounds the periphery of the shank part located inside the valve part 7. This prevents complete removal of the valve part 7 from the shank part 6, since the inwardly upset rim 43, on loosening the valve part, serves as an abutment for the screw thread located on the end 35 projecting from the container. The abutment 43 is spaced from the threaded section by a distance such that it permits movement of the valve part 7 and the shank part 6 to free the radial drillings 41 and 42.

The sealing between the shank part 6 and the valve part 7 is formed by a resilient seal 44. The sealing ring 44 is disposed on a shoulder 45 in the valve part 7 above the drillings 41 and 42. If the valve part 7 is firmly screwed on to the shank part 6, the rim of the upper orifice of the shank part 6 rests on the sealing ring 44 so that the drilling 33 through the shank part 6 and the drilling 36 through the valve part 7 form a sealed passageway. When in this position liquid is forced from the container through this passageway, the liquid pressure lifts the ball 38 from its seat 39. The liquid can pass the ball 38 and escape dropwise from the opening surrounded by the rim 40. The finest and most uniform distribution is thus made possible, so that fabrics or the like can be dabbed or stroked with the valve part orifice, the ball 38 rolling in the well 37 on its seat 40. The ball 38, whose inner side is continuously moistened by liquid flowing through the passageways 33, 36 is thus continuously covered with a self-renewing liquid film which is delivered from the part of the ball 38 projecting beyond the rim 40.

In order to refill the container, the valve part 7 is unscrewed until the abutment 43 on the screw thread contacts the end 35 of the shank part 6. In this position, the valve part is raised so that the connecting edge of the end 35 of the shank part 6 is located beneath the radial drillings 41, 42. The radial drillings thus represent an open passage to the inside of the container. The front end of the delivery and filler device is then immersed in a cosmetic liquid or in the neck of a large flask or vessel so that the openings 41, 42 lie beneath the surface of the liquid. By pressing on the elastic container 1, the air located therein is expressed. On freeing the container wall from pressure, this assumes its original form and hence produces a vacuum inside the container, which draws liquid through the radial drillings 41, 42 and the passageway 33 into the container. In this way, filling of the container is possible without the help of a funnel or other filler device. After filling, the valve part 7 is again firmly screwed on to the shank part 6, the orifice rim of the end part 35 resting on the seal 44 and the passage through the drillings 41, 42 being sealed. Operation of the screw connection is facilitated by grooves (knurling) 46 advantageously provided around the valve part. Further sealing with the cap replaced is then effected by the action of the resilient sealing 13 on the rim 40 and the valve member 38 as well as the other sealing means described above.

The construction of the container according to the invention with the peripheral rim 9 ensures filling of the container without losses, since on immersing the valve part 7 in the neck of a flask the upper rim of the flask rests against the inside 47 of the rim 9 and the surface 48 and the escape of liquid is prevented, if the flask is inverted with the container in place, so that the openings 41, 42 are surrounded by liquid. If the rim at the orifice of the flask is wider than the diameter permitted by the arrangement of the rim 9, the rim 9 rests with its end tightly on the rim of the flask, so that escape of liquid is prevented in this way. It is within the scope of the invention to prove a special sealing device over the valve part 7 during filling, which either abuts the surface 48 or the rim 9. In this way, it is possible to provide a sealing abutment surface for almost any orifice of a container, so that filling of the container according to the invention can be carried out in any case readily and without losses.

What we claim is:

1. A container having in combination a flexible wall portion, a non-flexible nozzle portion connected to said wall portion, a tubular shank member passing through said nozzle portion opening into said container, a valve part screwed on the exposed end of said tubular shank member and in communication with the bore thereof, valve means within said valve part for dispensing the content of said container, said valve means comprising a movable valve member arranged within said valve part and adapted to close a valve seat communicating with the bore of said shank member, and means for refilling said container, said means comprising openings in said valve part which are arranged to communicate with the bore of the tubular shank member upon axial movement of the valve part.

2. In a container as in claim 1 wherein peripheral rim means are formed on the end of said nozzle portion adapted to form a seal with the refilling container.

3. A container having in combination a flexible wall portion, a threaded nozzle portion enclosing one end of said wall portion, a base enclosing the other end of said wall portion, a tubular shank part having an axial passageway within said nozzle portion and extending therefrom, said passageway open at one end to the interior of said container, a valve part carried on the exposed end of said tubular shank in communication with the other end of said passageway and mounted for axial movement thereto, said valve part including a movable valve member adapted to close a valve seat having communication with said passageway, means carried by said valve part adapted to open said passageway to the atmosphere at a first axial position of said valve part and sealing means adapted to seal said passageway from the atmosphere at a second axial position of said valve part.

4. In a container as in claim 3 wherein a flexible covering encompasses the wall portion of said container and means are provided at each end of said container to maintain said covering in position.

5. In a container as in claim 3 including a threaded cap threadedly attached to said nozzle portion and sealing means within said cap sealingly engaging said valve part.

6. In a container as in claim 4 wherein said means maintaining said covering in position comprises a cap inserted over the base of said container and an annular attachment adjacent said nozzle portion, said cap and attachment having depending flange portions overlying said covering.

7. A container having in combination a flexible wall portion, a threaded nozzle portion enclosing one end of said wall portion, a base enclosing the other end of said wall portion, a tubular shank part having an axial passageway within said nozzle portion and extending therefrom, said passageway open at one end to the interior of said container, threads formed on the exposed portion of said shank, a valve part threadedly connected to said shank part, an axial bore within said valve part communicating with the other end of said passageway, means carried by said valve part engageable with the threads of said shank part limiting the axial position of said valve part on said shank part, a ball valve within said valve part, a valve seat concentrically disposed to the bore of said valve part engageable by said ball whereby said bore may be sealed, drillings within said valve part adapted to be closed by the threaded portion of said shank part in a first axial position of said valve part and open to said passageway at a second axial position of said valve part and sealing means sealingly interposed between said bore and said passageway in said first axial position of said valve part.

References Cited in the file of this patent

UNITED STATES PATENTS 2,204,778    Sturm                June 18, 1940

FOREIGN PATENTS 26,881    Denmark            Nov. 8, 1920